United States Patent [19]
Russell

[11] 3,930,596
[45] Jan. 6, 1976

[54] COMPONENTS FEEDING DEVICES

[75] Inventor: Walter Alan Russell, Fareham, England

[73] Assignee: Elite Engineering Limited, Gosport, England

[22] Filed: May 13, 1974

[21] Appl. No.: 469,282

[30] Foreign Application Priority Data
May 11, 1973 United Kingdom............... 22622/73

[52] U.S. Cl................................. 221/242; 221/283
[51] Int. Cl.²........................................ B65H 31/20
[58] Field of Search ........... 221/200, 204, 156, 175, 221/178, 183, 184, 65, 241, 242, 283; 222/181; 214/17 D; 198/220 BA; 214/301

[56] References Cited
UNITED STATES PATENTS

| | | |
|---|---|---|
| 1,990,879 | 2/1935 | Picard............................ 222/181 X |
| 2,584,466 | 2/1952 | Kaserman....................... 221/178 X |
| 2,945,613 | 7/1960 | Gerding et al................... 221/200 X |
| 3,399,793 | 9/1968 | Walker et al.................... 221/183 X |

Primary Examiner—Robert B. Reeves
Assistant Examiner—Joseph J. Rolla
Attorney, Agent, or Firm—Stevens, Davis, Miller & Mosher

[57] ABSTRACT

A vibratory hopper for feeding wired electrical components such as capacitors, resistors one by one to a work station includes a pair of non-vibratory guide members mounted on a stationary frame member independent of the hopper, the components being fed between the nose portion of a strip clamped to a stationary member and the pair of non-vibratory guide members into a channel formed between parallel zig-zag guides located intermediate the hopper and the work station.

2 Claims, 2 Drawing Figures

COMPONENTS FEEDING DEVICES

This invention relates to devices for feeding components such as printed circuit board components to a work station and particularly relates to a vibratory hopper arranged to receive the components and feed the components one by one in stacked relationship via parallel guide channels to the work station.

Heretofore, elongate electrical components, such as capacitors and resistors, having a lead projecting from each end of the component for insertion in holes in a printed circuit board, have been placed in a vibratory hopper from where the components are vibrated towards a discharge throat and proceed one by one via a pair of spaced zigzag guides to a work station, the guides each having a width to accommodate the wires of the components and the spacing between the guides being such as to allow the bodies of the components to pass between the guides.

An object of the present invention is to provide an improved vibratory hopper for such a component feed device.

According to the present invention there is provided a vibratory hopper for supplying elongate components one by one to a work station via parallel guide channels wherein the hopper is adjustable in width to accommodate components of various lengths and wherein the components are vibrated to pass one by one between a guide member mounted on the hopper and a pair of non-vibratory guide members secured to a frame member and independent of the hopper.

A preferred embodiment of the invention will now be described by way of example only with particular reference to the accompanying drawing wherein.

Figure 1:
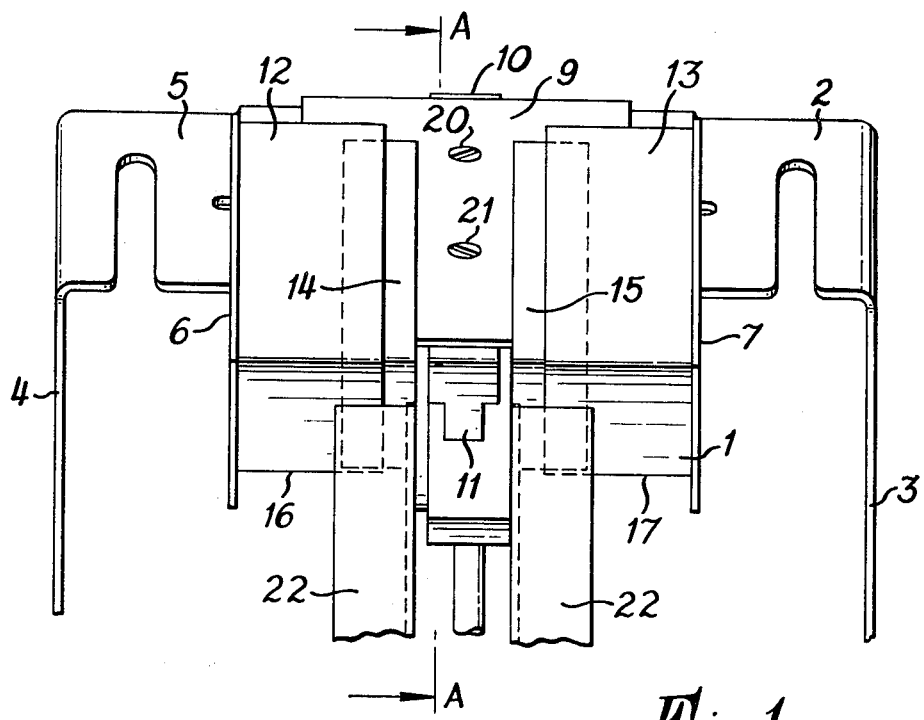
FIG. 1 is a plan view of the vibratory hopper.
Figure 2:
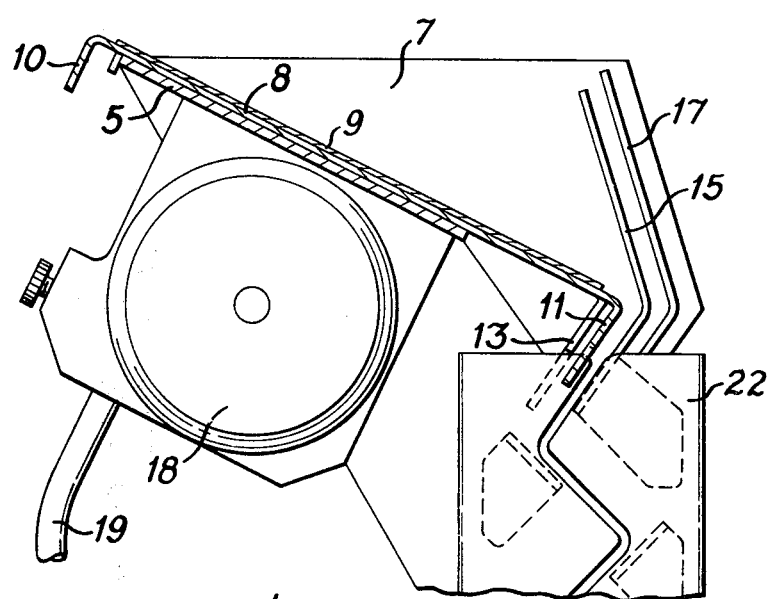
FIG. 2 is a section taken along the lines A—A of FIG. 1.

The vibratory hopper 1 is mounted on a U-shaped support member 2 comprising upstanding limbs 3, 4, arranged to be mounted on a stationary frame member (not shown), the bight 5 of the U-shaped member 2 being slotted to allow the side wall members 6, 7, of the hopper 1 to be moved towards or away from each other to accommodate different length components.

A metal strip 8 is located on the bight 5 between the bight and a clamping plate 9 and the ends of the strip 8 are bent over the rear and front edges of the bight 5 as shown at 10, 11, respectively, the plate 9 clamping the strip 8 and the base portions 12, 13 extending normal to the side wall members 6, 7 of the hopper to retain the side wall members in correct spaced apart relationship and to maintain the turned over nose portion 11 of strip 8 a required distance from a pair of upstanding spaced guide members 14, 15.

The guide members 14, 15 are secured to adjustable zigzag frame members 22 such that the distance between the guides can be adjusted to suit different length components, and the guides are located between the front edge of the parts 12 and 13 and the front walls 16, 17 of the hopper.

Components consisting of a central member having a wire extending on either side thereof are fed at random into the hopper which is vibrated by a vibratory means. In the embodiment described the device 18 is supplied with compressed air via tube 19. The distance between the side wall members 6, 7 of the hopper is adjusted to accommodate the particular length of the wires of the components and the position of the strip 8 is adjusted to allow the central part of the components to pass between the overlying nose portion 11 thereof and the inner faces of the guide members 14, 15, and the clamping plate 9 is then tightened by screws 20, 21, to retain the hopper members 6, 7, the correct distance apart and to maintain the strip the correct distance from the non-vibratory guide members 14, 15. The distance between the non-vibratory guide members 14, 15 is adjusted to suit the length of the components fed to the hopper.

The vibrations imparted to the hopper cause the components to proceed one by one in stacked relationship between the nose portion 11 of the strip and the inner surfaces of the fixed guide members 14, 15 and via the spaced zigzag guides 22 to the work station. A feature of the present invention is that the guides 14, 15 are located on the stationary guide members 22 and are not vibrated by the vibratory member 18.

I claim:

1. A vibratory hopper for supplying elongate components one by one to a work station via parallel guide channels mounted on a U-shaped support member comprising a pair of upstanding limbs for mounting said member on a stationary frame member, and an interconnecting bight portion, said hopper having spaced wall members adapted to move over said bight portion to accommodate different length components in the hopper, a strip member clamped on the bight portion and having a portion at its ends bent over rear and front edges of the bight portion, a pair of non-vibratory guide members disposed opposite said portion bent over the front edge of the bight member, said bent over portions extending normal to the spaced wall members and the portion of the strip member bent over the front edge of the bight portion being maintained a predetermined distance from the front edge of the bight portion and from a pair of non-vibratory spaced guide members.

2. A vibratory hopper as claimed in claim 1 wherein the components are fed between the portion of the strip member bent over the front edge of the bight portion and the pair of non-vibratory guide members into a channel formed between parallel zigzag guides.

* * * * *